Dec. 13, 1955 A. F. BEHLEN 2,726,895
MOBILE OVERHEAD IRRIGATING DEVICE
Filed Sept. 15, 1952 3 Sheets-Sheet 1
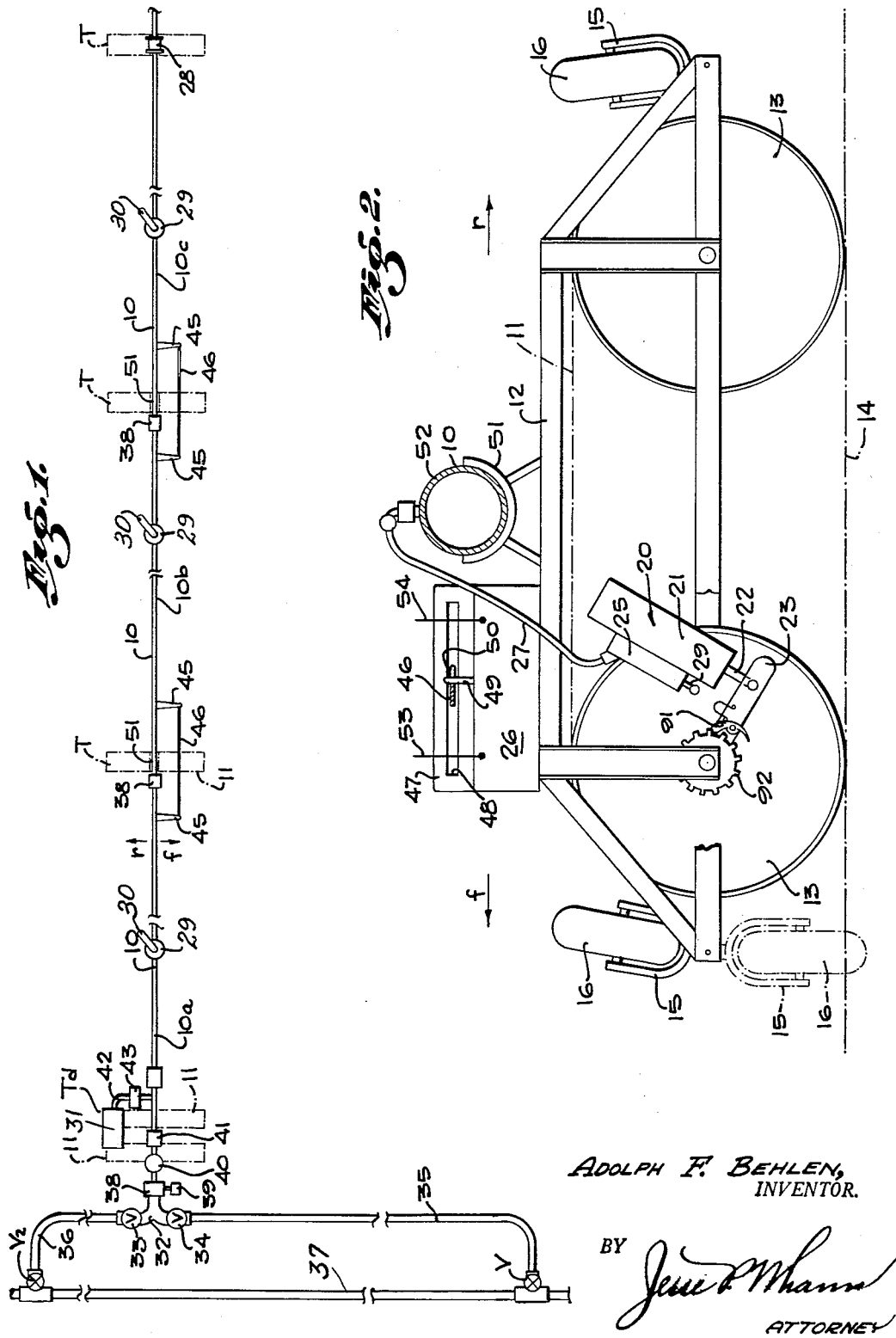
ADOLPH F. BEHLEN,
INVENTOR.
BY
ATTORNEY

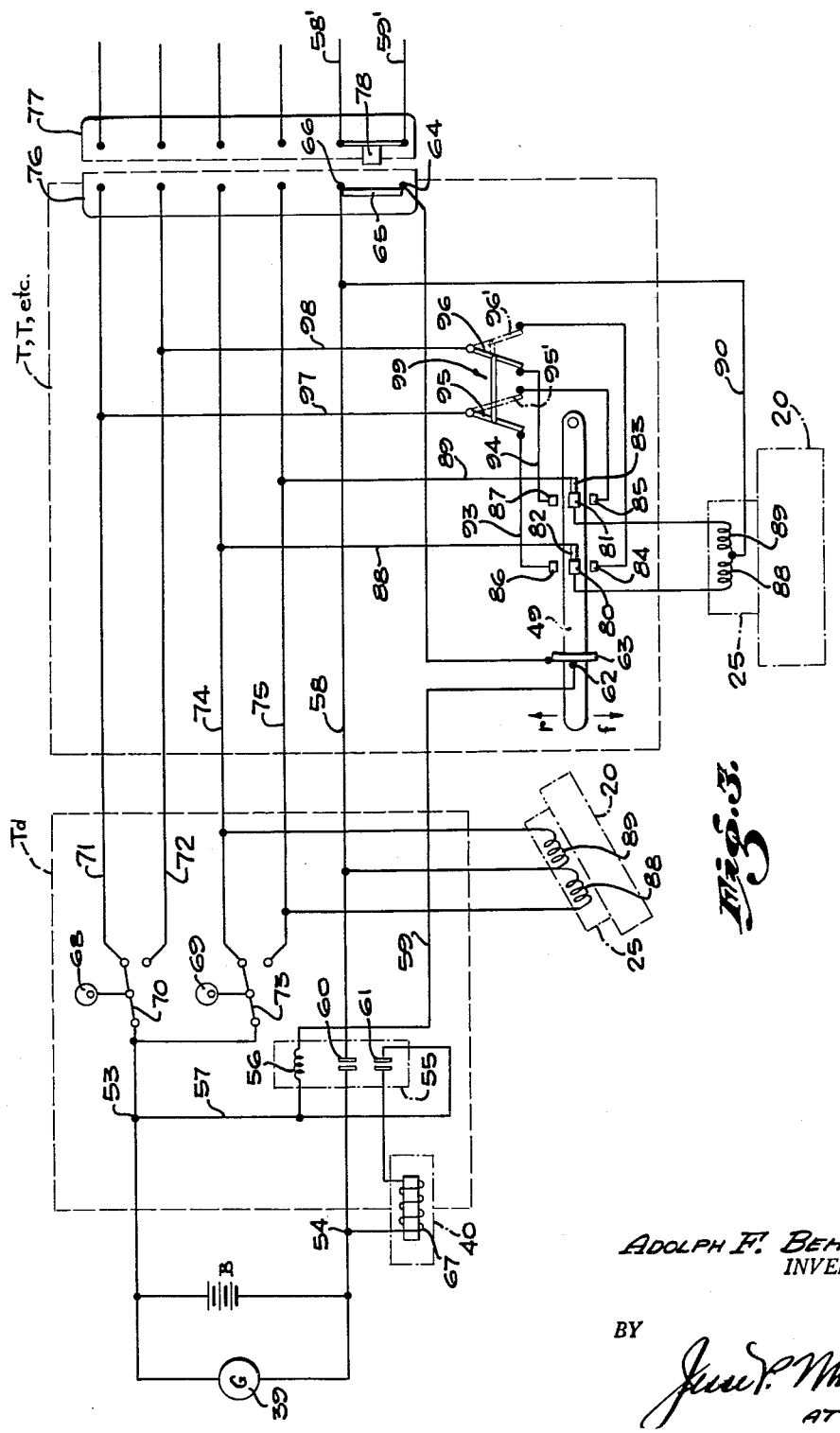

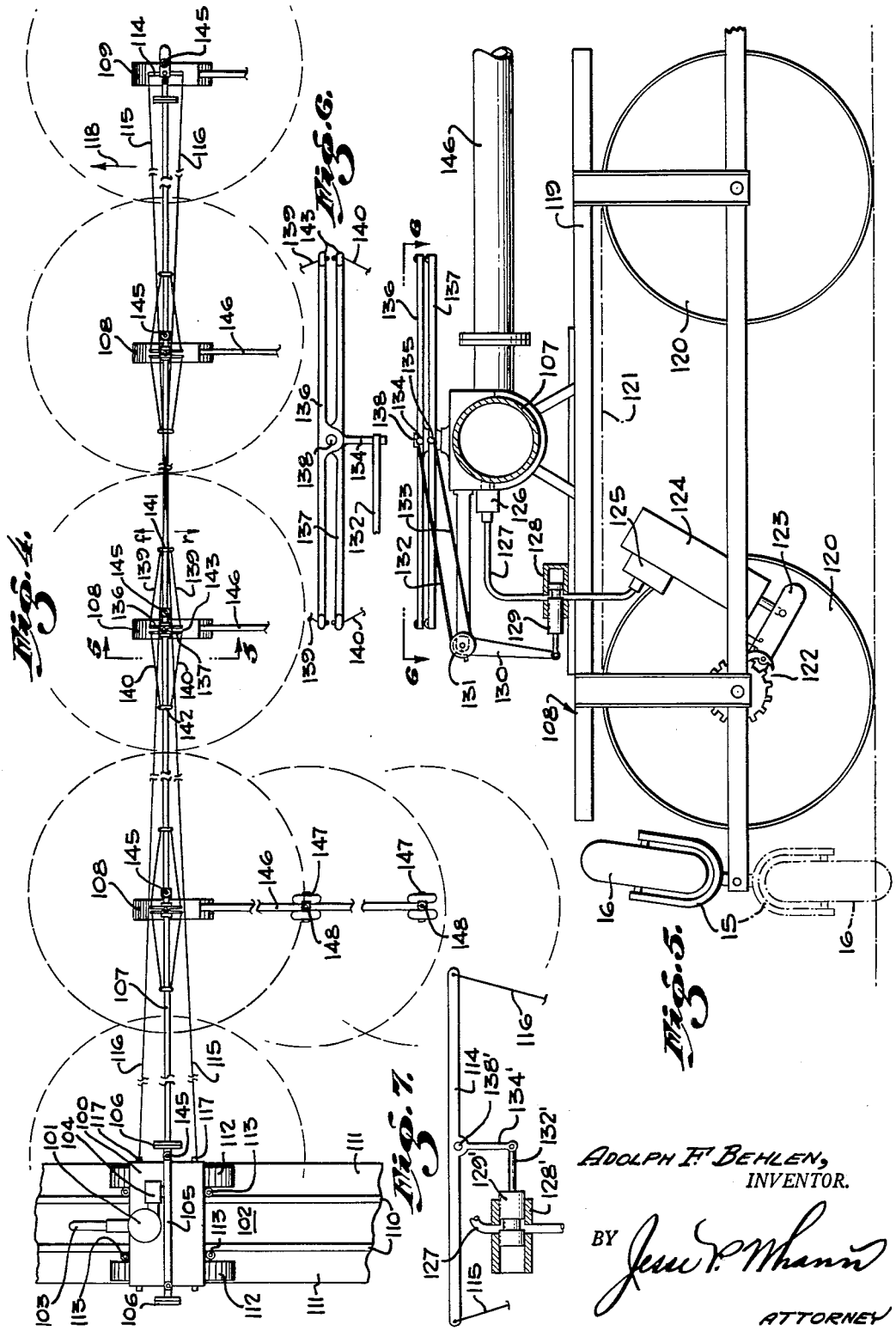

United States Patent Office 2,726,895
Patented Dec. 13, 1955

2,726,895

MOBILE OVERHEAD IRRIGATING DEVICE

Adolph F. Behlen, Los Angeles, Calif.

Application September 15, 1952, Serial No. 309,723

15 Claims. (Cl. 299—49)

My invention relates to devices for overhead irrigation by which irrigating water is sprayed onto the soil so as to be substantially evenly distributed and of proper amount, and relates in particular to an irrigating device which moves over a large surface of ground and thereby irrigates a large area without need for expensive permanent irrigating equipment now extensively employed.

One of the objectives of the invention is to provide a simple means for preventing water wastage. With the gradual diminishing of water reserves economization of water utilization in the irrigation of crops becomes important. Under certain conditions the saving of water by overhead irrigation as compared to ground flooding practices may be 40% or greater. This means that in an agricultural district having a limited supply of water, about 66% greater area of land may be kept under cultivation by use of overhead irrigation than by flooding or ditching. Although the advantages of overhead irrigation are recognized, its adoption has been retarded by scarcity of materials and high cost of installing the many miles of pipe required for the overhead irrigation of a section of land. My invention provides a mobile irrigating device by which large areas may be subjected to overhead irrigation at small cost as compared to other methods of overhead irrigation and at less cost than required for irrigation by flooding or ditching.

The surface irrigation of land involves two principal items of expense, namely, the cost of leveling the ground and also the labor involved in the actual delivery and control of the water over the surface of the ground or through ditches. My invention minimizes the amount of leveling which must be done and eliminates a great deal of labor in the application of water to the soil. An additional important feature of my invention is that it will without waste uniformly apply commercial fertilizer preparations to the soil. This can not be done efficiently with the other methods of irrigation.

It is an object of the invention to provide an irrigating device comprising a plurality of tractors disposed in laterally spaced relation so as to support a transverse water distributing pipe having water spray means thereon so that when the tractors are operated in unison the pipe, which is supported in overhead relation to the ground, will be moved in a direction at right angles to the length of the pipe, over an area of ground having a width substantially equal to the length of the pipe. For example, if the water distributing pipe is 400 feet long, a movement of the supporting tractors through a distance of slightly over a thousand feet will accomplish the irrigation of ten acres.

It is an object of the invention to provide simple means for joining sections of pipe together in end-to-end relation so as to form the water distributing pipe which is supported by the tractors, and to provide a simple means for controlling movement of the tractors so that the component pipe sections will be maintained in practical alignment.

A further object of the invention is to provide for the irrigating device, a control means which will render the entire device inactive when a maximum disalignment of the piping sections is exceeded, including the cutting off of the supply of water to the distributing pipe so that water wastage will be prevented.

A further object of the invention is to provide a means for delivering a flow of liquid fertilizer into the irrigating water, in selected timed relation to the forward movement of the tractors, making it possible to apply to the ground a dose of fertilizer followed by sufficient untreated water to carry the fertilizer down into the soil.

A further object of the invention is to provide electrically operated means for controlling the operation of the irrigating device an electrical generator carried by the device and driven by the flow of water therein for supplying electrical energy to operate the various controls of the device.

A further object of the invention is to provide an irrigating device having a transverse water distributing pipe and hydraulically driven tractors for moving the distributing pipe, the hydraulic means being of simple form and having control means which may be either electrical or mechanical for effecting movement of the tractor in a manner to keep them in practical operative alignment.

A further object of the invention is to provide a simple form of the invention especially adapted for use on sandy soil, wherein all of the tractors, except possibly the main tractor, are controlled by valve means without the use of electric switches.

A further object of the invention is to provide a device which has a main tractor supporting a pump which draws water from a ditch along which the main tractor runs, providing a wall or curve extending down the field which serves as a guide for the equipment.

Further objects and advantages of the invention will be brought out in the following part of the specification wherein I have shown a preferred form of the invention in schematic form for the purpose of making a complete disclosure which will enable others to practice the invention, without limiting the scope of the invention set forth in the accompanying claims.

Referring to the drawings which are for illustrative purposes only:

Fig. 1 is a fragmentary perspective view showing an irrigating device embodying the invention, the parts thereof being indicated schematically.

Fig. 2 is an enlarged elevational view of one of the tractors T shown in Fig. 1.

Fig. 3 is a diagrammatic view of the electrical equipment employed in the form of the invention shown in Figs. 1 and 2.

Fig. 4 is a schematic plan view of an alternative form of the invention.

Fig. 5 is a schematic fragmentary sectional view taken as indicated by the line 5—5 of Fig. 4.

Fig. 6 is a plan view, looking downward from the line 6—6 of Fig. 5, showing the control levers of a tractor.

Fig. 7 is a fragmentary schematic view showing the control valve for the last tractor.

In Fig. 1, I show a plurality of tractors T disposed in laterally spaced relation so as to travel down paths or aisles between plant rows. The aisles occupied by the tractors T are not adjacent each other but are spaced a number of rows apart depending upon the lengths of pipes 10 which are supported by the tractors T in end-to-end relation so as to extend across and above the rows R in perpendicular relation thereto. At one end of the line of pipes 10 there is a main tractor Td which is in all respects the same as the tractors T with the exception that the tractor T*d* has two tracks 11, of the caterpillar type instead of only a single track 11, as on the tractors T.

As shown in Fig. 2, each of the tractors T has a frame 12 supporting wheel members 13 over which the track means 11 runs in the well known manner, so as to engage the surface of the ground 14 and travel therealong when the wheel members 13 are turned and the belt or track means 11 thereby driven. One or more supporting wheels 11*a* may be used, depending upon the spacing of the wheels 13. At each end of the frame 12 there is a swingable bracket 15 carrying thereon a wheel 16 adapted to be brought into engagement with the ground surface when the supporting bracket 15 therefor is swung downwardly. When the tractor T is lifted and both of the brackets are swung into their lowered positions, the tractor frame 12 will be supported so that the track thereof will be raised from the surface of the ground, permitting the tractor to be moved transversely of the direction of movement which it is given by the operation of its track means 11. When the wheels 16 of all of the tractors T and T*d* are adjusted to their lowered positions, the entire irrigating device may be shifted in a direction lengthwise of the string of pipes 10 onto an adjacent section of land which is to be irrigated.

Each of the tractors has a hydraulic motor 20 adapted, under proper control, to move it either forwardly or rearwardly as indicated by the arrows *f* and *r*. The hydraulic motors are of common construction having an external cylinder 21 with piston means operative therein and having a projecting piston rod 22 arranged to reciprocate a lever 23 which has ratchet connection with one of the wheel members 13 of the tractor. Each hydraulic motor 20 has therewith an electrically operated control valve mechanism 25 which is electrically connected with a control switch mechanism 26 so as to operate in timed relation to the hydraulic motors of other tractors forming a part of the irrigating device. Each of the electrically operated control valves 25 has a water connection 27 with one of the pipes 10. The control valve 25 directs water received under pressure from the connection 27, through the hydraulic motor 20 so that the pressure of this water will be utilized in operating the motor to furnish power for forward or rearward movement of the tractor. As schematically shown, there is a water outlet 29 at the lower end of each control valve 25 disposed so that the water which is discharged from the motor 20 will be sprayed laterally across the ground.

In Fig. 1, I show in elevation, the manner in which ends of adjacent pipes 10 are connected by flexible joints 28 adjacent the upper portion of the tractors so that water will flow from end-to-end of the system of pipes shown in Fig. 1. It will be understood that the unused end of the last pipe of the system of water distributing piping will be closed by a suitable plate. The number of tractors to be employed in the irrigating device at any time depends upon the width of the field portion which is to be irrigated during a single trip of the irrigating device.

Mounted on the upper part of each pipe 10, so as to receive water under pressure, there is a sprinkler head 29 of rotatable type having a nozzle 30 which will spray water over a surrounding area. The spray heads 29 are of such size and are so distributed that all of the ground from one end to the other of the irrigating device will be covered. If the irrigating device is standing still, the water delivered by the spray heads 29 will cover a strip of ground having the system of pipes 10 as its center, and as the tractors are propelled so as to move the irrigating device either forwardly or rearwardly, as indicated by the arrows, Fig. 1, the complement of spray heads 29 will be moved along, thereby completely covering an area of ground having a width corresponding to the length of the irrigating device.

The first tractor of the system T*d* is provided with two tracks 11 so that it will sustain a tank 31 adapted to receive fertilizer or insecticide and certain pieces of control mechanism which will be hereinafter described. On its front (lefthand) side the tractor T*d* supports a water inlet Y fitting 32 having inlet branches 33 and 34 adapted to be connected to flexible conduits or hoses 35 and 36 arranged to be connected to valve outlet V2, etc. disposed along the water supply piping 37. If the irrigating device moves along a field, the hoses 35 and 36 are progressively connected to successive valve outlets V, V2 so that the irrigating device will be continuously supplied with water from the water supply piping 37.

The inlet fitting 32 has therein a water driven motor 38 which is acted upon by the water flowing into the irrigating device so as to drive a generator 39 to supply electrical current for the operation of the system. In series with the inlet fitting 32 there is a solenoid operated cut-off valve 40 for cutting off the flow of water into the irrigating device under emergency conditions which will be hereinafter explained. Also, there is a flow meter 41 which not only records the volume of water which has been passed through the irrigating device, but also actuates the electrical controls of the device so that the various functions of cooperating parts of the device will be performed in timed relation to the flow of water through the irrigating device to the soil. As further shown in Fig. 1, a delivery pipe 42 connects the outlet of the fertilizer tank 31 with the flexible connector 28 of the first tractor T*d* and an electrically operated dose feeder 43 is connected in series in the pipe 42 for controlling the delivery of fertilizer from the tank 31 into the front end of the system of pipe 10.

Levers 45, projecting forwardly from the pipes 10, near the ends thereof support control bars 46 in crossing relation to the tractors. As shown in Fig. 2, each tractor T has a guide member 47 providing a horizontal slot 48 through which a control bar 46 may extend. When the pipes 10, Fig. 1, are in alignment, the control bars 46 will be parallel to the center line defined by the pipes 10. Should a tractor T move either forwardly or rearwardly from its position of alignment with the remaining tractors this relationship of the associated control bar 46 will be changed. That is to say, if a tractor T moves ahead of the tractors adjacent it, the movement of the ends of the adjacent pipes 10 into angular position will cause the control bar 46, Fig. 2, to move in the slot 48 toward the center of the tractor. If tractor T lags behind there will be a relative movement of the control bar 46 in the slot 48 away from the center of the tractor.

The first pipe 10 indicated at 10*a*, Fig. 1, is rigidly secured to the main tractor T*d* in laterally extending relation thereto. At the rightward end thereof this pipe 10*a* is connected by a flexible coupling with the leftward end of the second pipe 10*b* of the system. The leftward end of the pipe 10*b* rests in and is secured in a transverse saddle 51 which is secured on the top of the first of the tractors T. Clamping straps 52, as shown in Fig. 2, are employed to secure the pipe 10*b* in the saddle 51 of a tractor T. It will be observed that the rightward end of the pipe 10*b* is connected by a flexible coupling 38 with the leftward end of a pipe 10 indicated at 10*c*, which in turn is supported in the saddle 51 of the next succeeding tractor T. This arrangement is carried on throughout the remainder of the pipes 10 and the tractors T.

In the form of the invention shown in Fig. 1, the tractors T all have associated control bars 46 connected to the piping 10, but the main tractor T*d* does not require this control bar since the first pipe 10*a* is rigidly connected thereto. The leftward end of each pipe 10*b*, 10*c*, etc., is rigidly secured to a tractor T, but the rightward end of each pipe 10 is flexibly connected to a tractor T through its connection by a flexible coupling 38 with the end of the next succeeding pipe 10 which is in turn rigidly connected to a tractor T.

The electrical control means of the device is schematically shown in Fig. 3. As shown therein a battery B is bridged across the generator 39 so as to form a constant power supply having terminals 53 and 54. A safety switch 55 having a hold-in electromagnet 56 is provided. One terminal of the hold-in electromagnet 56 is connected by a conductor 57 with the terminal 53, and the remaining side of the electromagnet 56 is connected to the conductor 59 a safety circuit which includes conductors 58 and 59 and a breaker switch 60, forming a part of the safety switch 55. A second breaker switch 61 is located adjacent the breaker switch 60. When the safety switch 55 is manually operated to close the switches 60 and 61, the hold-in electromagnet 56 will be energized providing the circuit through the conductors 58 and 59 is not open. The safety circuit including the conductors 58 and 59 has therein contacts 62, 63, 64, 65 and 66 which are normally engaged, as shown in Fig. 3, during the normal operation of the device. Should the safety circuit be opened, the electromagnet 56 will be deenergized and the breaker switches 60 and 61 will be allowed to open. The solenoid valve 40 has a solenoid winding 67 connected in series with the switch 61. When the switch 61 is closed the winding 67 will be energized and the valve 40 will be held open. Failure of the safety circuit will result in opening of the switch 61, thereby deenergizing the winding 67 so that the solenoid valve will close, shutting off the flow of water into the piping 10.

The meter 41 is arranged to drive a high speed cam 68 and a low speed cam 69. The high speed cam 68 actuated a movable switch member 70 arranged to alternately connect the terminal 53 with conductors 71 and 72. The low speed cam 69 actuates a switch member 73 so that it will alternately connect the terminal 53 with conductors 74 and 75. The conductors 58, 59, 71, 72, 74 and 75 are included in a cable which extends to a multiple conductor connector 76 mounted on the first tractor T, there being a companion connector 77 arranged to be connected to the connector part 76 so as to carry the electrical circuits on to the succeeding tractor T. When the connector parts 76 and 77 are coupled a member 78 will move the contact 65 out of engagement with the contact 64 and 66, but the safety circuit which is then carried onward by conductors 58' and 59' will be connected by contacts disposed at the last tractor T of the series. On each of the tractors T there is a switch mechanism 26 arranged to be actuated by the switch operating lever 49 associated with the switch mechanism of such tractor. The lever 49 is swung in the direction of the arrow f, Fig. 3, when the tractor T moves forwardly or ahead of its position of alignment with the remaining tractors, and this lever 49 moves in the direction of the arrow r when the tractor T drops behind the remaining tractors. As schematically shown, the lever has contacts 80 and 81 connected thereto or mounted thereon so that these contacts 80 and 81 will be moved back and forth as the lever 49 is moved back and forth from centralized position. Stationary contacts 82 and 83 are provided which are engaged by the movable contacts 80 and 81 when the lever 49 holds the contacts 80 and 81 in the centralized position in which they are shown in Fig. 3. Stationary contacts 84 and 85 are disposed adjacent the movable contacts 80 and 81 so that when the lever 49 is moved in the direction of the arrow f, the contacts 80 and 81 will be respectively brought into engagement with the contacts 84 and 85. The contacts 86 and 87 are mounted on the opposite sides of the contacts 80 and 81 so that when the lever 49 is moved in the direction of the arrow r the contacts 80 and 81 will respectively engage the contacts 86 and 87. Conductors 88 and 89 respectively connect the stationary contacts 82 and 83 with the conductors 74 and 75, so that when the lever 49 is in centralized position, electromagnets 88 and 89 of the hydraulic motor valve mechanism 25 will be alternately energized with low speed electrical impulses resulting from the operation of the switch member 73 of the control mechanism mounted on the main tractor Td. The electromagnets 88 and 89 are connected to the terminal 54 of the power source by a conductor 90 and the conductor 58 forming a part of the safety circuit. Accordingly, when the lever 49 is in centralized position the electrically operated valve mechanism 25 of the hydraulic motor 20, Fig. 1, will effect an operation of the motor so as to reciprocate the piston rod 22 and thereby swing the lever 23 back and forth so that the pawl 91 of the Proto ratchet 92 will act to rotate the front wheel member 13 in forward (counterclockwise) direction and move the tractor 10 forwardly at a controlled rate.

If, for some reason the tractor 10 should get ahead of the remaining tractors 10 the lever 49 will be swung in the direction of the arrow f and the contacts 80 and 81 will be moved toward the contacts 84 and 85 and out of engagement with the contacts 82 and 83, thereby disconnecting the electromagnets 88 and 89 from the conductors 74 and 75, stopping the operation of the hydraulic motor 20 and causing the tractor 10 to remain stationary until the remaining tractors 10 catch up with it. The contacts 86 and 87 are connected through conductors 93 and 94, switch members 95 and 96, and conductors 97 and 98 with the conductors 71 and 72 which are alternately energized with high speed impulses. Should the tractor T lag behind the remaining tractors, the lever 49 will be swung, in a direction of the arrow r. This will carry the contacts 80 and 81 toward the contacts 86 and 87 and out of engagement with the contacts 82 and 83. As engagement between contacts 80 and 81 and contacts 82 and 83 is broken, contacts 80 and 81 will be respectively brought into engagement with the contacts 86 and 87, thereby connecting the electromagnets 88 and 98 of the hydraulic motor control valve mechanism 25 with the conductor 71 and 72, whereupon the more rapid reciprocation of the switch member 70 will result in high speed impulses being alternately delivered to the electromagnets 88 and 89, causing the hydraulic motor 20 to operate at higher speed than the remaining hydraulic motors to move the tractor 10 forwardly into alignment with the remaining tractors. At this time the contacts 84 and 85 are disconnected from the conductors 71 and 72 owing to the present adjustment of the switch parts 95 and 96 which form part of a reversing switch 99 which is positioned for forward travel of the tractor 10. At this time, movement of the lever 49 in the direction of the arrow f which would bring the contacts 80 and 81 respectively into engagement with the contacts 84 and 85 will have no effect for the reason that the contacts 84 and 85 are disconnected from any source of electrical energy. As previously explained, the main tractor Td has a hydraulic motor 20 for operating the same and is also provided with a ratchet mechanism such as shown in Fig. 2. As shown in Fig. 3, the electromagnets 88 and 89 of the valve mechanism 25 on the tractor Td are connected directly to the conductors 74 and 75 so that as long as the device is in operation, the operation of the switch member 73 will result in the delivery of low speed impulses alternately to the electromagnets 88 and 89 effecting a constant forward movement of the tractor Td.

When the irrigating device reaches the end of the irrigated area, it is shifted over to an adjacent area and is then operated in reverse direction. That is to say, the irrigating device shown in Fig. 1 is operated in forward direction, as indicated by the arrow f until the end of the field is reached. The irrigating device is then shifted bodily in a direction corresponding to the axis of the piping 10 onto an adjacent area and is then operated in reverse direction indicated by the arrow r to the opposite end of such adjacent area. When reverse movement of the irrigating device is desired, the pawls 91, Fig. 1, of all of the ratchet mechanisms 92 of the tractors T and Td are adjusted for operation in opposite directions. For example, the pawl 91 shown in Fig. 1 will be rotated in clockwise direction for the position in which it is shown so as to bring its lower end into engagement with the toothed wheel of the ratchet 92. Then, reciprocation of the lever 23 will cause the associated wheel member 13 to rotate in clockwise direction instead of counterclockwise direction and cause the tractor to move in the direction of the arrow *r* of Fig. 2. At the time the operator adjusts the ratchet pawls 91 he also adjusts each reversing switch 99 for reverse operation of the tractor 10 associated therewith. This is accomplished by swinging the switch members 95 and 96 from the positions in which they are shown in full lines in Fig. 4 into the dotted line positions 95' and 96', so as to connect the contacts 84 and 85 through the conductors 97 and 98 with the conductors 71 and 72 which are receiving high speed impulses as the result of the operation of the switch member 70. This adjustment of the switch 99 disconnects the contacts 86 and 87 so that they are then inactive and when the lever 49 is moved in the direction of the arrow *r* the only effect will be to move the contacts 80 and 81 out of engagement with the contacts 82 and 83 and disconnect the electromagnets 88 and 89 from the conductors 74 and 75. However, if the lever 49 is now moved in the direction of the arrow *f*, the contacts 80 and 81 will be brought into engagement with the contacts 84 and 85, and high speed impulses from the conductors 71 and 72 will be alternately passed through the electromagnets 88 and 89 owing to the fact that the contacts 84 and 85 are now connected by the reversing switch 99 with the conductors 71 and 72. Referring again to Fig. 3, one of the contacts 62 or 63 is mounted on the lever 49 and the other of these contacts is stationary so that when the lever 49 is moved in either direction to an extreme position, determined by the length of the contact 63, disengagement of the contacts 62 and 63 will be effected, opening the circuit through the hold-in electromagnet 56 of the safety switch 55. Should any of the tractors T get too far out of alignment, either in forward or rearward direction, the extreme movement of the lever 49 will result in the shutting down of the irrigating device and the shutting off of the water until corrections have been made and the device restarted by manually closing the switch 55.

In the form of the invention shown in Fig. 4, a main tractor 100 is provided with a motor driven pump 101 which draws water from a ditch 102 through a depending suction hose 103, and discharges this water through a water meter 104 into a pipe 105 which extends transversely of the tractor 100 and has pipe couplings 106 at the ends thereof for alternate connection to water delivery piping 107, which is supported and moved along by supplementary tractors including intermediate tractors 108 and an end tractor 109.

The ditch or canal 102 is preferably lined with concrete and has upwardly projecting curbs 110. Concrete aprons 111 lie along each side of the ditch 102 so that the tracks 112 of the tractor 100 may travel therealong, and the tractor is provided with small wheels or rollers 113, rotating on substantially vertical axes and engaging the outer faces of the curbs 110, thereby providing means for guiding the tractor 100 along the path of movement defined by the ditch 102. The rollers 113, in cooperation with the guiding curbs 110, maintain the tractor oriented so that the pipe section 105 is perpendicular to the line of movement of the tractor.

The end tractor 109 has thereon a fulcrum lever 114, the ends of which lever are connected to light weight cables 115 and 116 which extend back over the tractors 108 in crossing relation to brackets 117 mounted on the side of the tractor 100 in front and to the rear of the pipe section 105. The lever 114 of the tractor 109 serves as a control for the power means of such tractor, to hold the tractor 109 centralized on the projected axis of the pipe section 105. Assuming that the system is traveling along the forward direction indicated by the arrow 118, if the tractor 109 lags behind, the piping 107 will be slightly bent, and the pull in the cable 116 resulting in the lag of the tractor 109 will cause the control lever 114 to rotate in clockwise direction relative to the tractor 109.

This relative rotation of the lever 114 will actuate the control associated with the tractor 109, as will be hereinafter explained, so that the tractor will be operated at increased speed to bring it to up to its proper position with relation to the main tractor 100. It is preferable that the forward movement of the tractor 100 be controlled in accordance with the amount of water delivered through the piping 107. The driving of the tractor 100, accordingly, may be under control of the meter 104, as explained with relation to Figs. 1 and 3. If, for any reason, the tractor 109 should advance ahead of the main tractor 100, there will be a counterclockwise rotation of the lever 114 as the result of tension exerted in the cable 115, and the control associated with the tractor 109 will effect a reduction of the speed of the tractor so that it will be brought back into alignment with the main tractor 100.

Each of the tractors 108 and 109 has the form schematically shown in Fig. 5. Each such tractor has a frame 119 carrying wheels 120, over which a belt or track member 121 runs. In this form of the invention the tractor is moved along by power derived from a continuously operating hydraulic motor. As a simple drive means, I have shown a ratchet mechanism 122 for driving one of the wheels 120 of the tractor, this ratchet mechanism having a lever arm 123 arranged to be reciprocated by a continuously operating hydraulic motor 124 having a valve mechanism 125 arranged to receive water under pressure from the piping 107 through a filter 126, conduit 127 and a valve mechanism 128 having a closure 129 which increases the flow of water to the motor 124 when it is moved in one direction and decreases the flow of water to the motor 124 when it is moved in the opposite direction. This closure 129 is connected to the lower end of an operating lever 130 having a wheel 131 fixed on its upper end and connected by cables 132 and 133 to levers 134 and 135 which project respectively from fulcrum levers 136 and 137 mounted in parallel relation on the same vertical pin 138, as shown in Figs. 4, 5 and 6. As shown in the central portion of Fig. 4, the ends of the fulcrum levers 136 and 137 are connected by pairs of lines 139 and 140 with clamps 141 and 142 which are secured to the pipe 107 on opposite sides of the tractor 108. It will be understood that the distance between the clamps 141 and 142 may be 30 or 40 feet, and when the tractor 108 moves forwardly with respect to the adjacent tractors, there will be a bending of the pipe 107 between the clamps 141 and 142, with the result that the rearward ends 143 of the levers 136 and 137 will be moved toward each other. That is to say, the lever 136 will be rotated in clockwise direction and the lever 137 will be moved in counterclockwise direction around the pin 138. Since the levers 136 and 137 are rotated in opposite directions, the short levers 134 and 135 which project therefrom will be moved in opposite directions. Viewed in Fig. 5, the lever 134 will move to the left, and the lever 135 will move to the right, causing a movement of the cables 132 and 133 which will rotate the lever 130 in counterclockwise direction, moving the closure 129 rightwardly so as to reduce the flow of water to the motor 124 and thereby reduce the speed of the tractor 108 to bring it back into alignment with the remaining tractors.

Should the tractor 108, shown in the center of Fig. 4, drop behind the remaining tractors for any reason, the fulcrum levers 136 and 137 will swing in directions opposite to those described in the preceding paragraph. The lever 134 which projects from the fulcrum lever 136 will be swung to the right and the lever 135 which projects from the lever 137 will be swung to the left, producing a clockwise rotation of the lever 130 and a movement of the closure 129 so as to increase the flow of water through the valve 128 to the motor 124 to speed up the forward travel of the tractor 108 to bring it back into alignment, or, in other words, to straighten out that portion of the piping 107 between the clamps 141 and 142.

In Fig. 7 I schematically show the manner in which the fulcrum lever 114, Fig. 4, on the end tractor 109, is connected to a throw control valve 128' functioning in substantially the same manner as the valve 128 described with relation to Fig. 5. The lever 114 is swung on a vertical pin 138' and has a lever 134' projecting therefrom. This lever 134' is connected by a link 132' with the closure 129' of the valve 128'. If the end tractor 109 moves ahead of its proper position relative to the main tractor 100, the tension in the line 115 will swing the lever 114 in counterclockwise direction, moving the closure 129' to the right, and reducing the flow of water to the hydraulic motor of the tractor 109. If the tractor 109 lags behind, tension in the cable 116 will swing the lever 114 in clockwise direction and move the closure 129' leftwardly to open the valve 128 and feed more water to the hydraulic motor of the tractor 109.

Ideal irrigation is achieved when the water is evenly distributed over the surface, or in other words, where each portion of the soil is caused to absorb the same amount of water. This ideal condition cannot be achieved where the water is applied to the surface faster than it can soak in, the excess of water forming puddles. It is evident that the water which runs into a puddle deprives the soil from which it runs of sufficient irrigation and excessively irrigates the soil below the puddle. In my present invention I provide a single automotive irrigating device which makes a plurality of applications of water at such spaced intervals that puddles will not form, enabling the irrigating device to move along at a higher rate of speed than where a single row of spray nozzles is employed.

Referring to Fig. 4, spray nozzles 145 are connected in spaced relation to the piping 107. From each of the tractors 108 and 109, a tubular member, such as a string of pipe or hose 146, is extended rearwardly, each of these members 146 being supported by dollies 147 so that as the irrigating device moves forwardly, the tubular member 146 will be pulled along behind the tractors 108 and 109. The front ends of the tubular members 146 are connected to the piping 147, and a suitable number of nozzles 148 are supported upon and connected to the tubular members 146, at such distances rearwardly from the nozzles 145 that the water from the first spray nozzles will have a chance to soak into the soil before additional water is added by the spray nozzles 148. Likewise, each succeeding spray nozzle 148 is spaced at such distance behind the preceding spray nozzle 148 that too rapid application of water to the soil will not take place, yet the system of nozzles will provide such an ample application of water that a reasonably rapid forward movement of the device may be maintained.

I claim as my invention:

1. In an overhead irrigating device for watering an area of ground: a plurality of laterally spaced tractors; transverse water distributing piping supported by said tractors; water delivery members connected to said piping at spaced points therealong for delivering water to the ground; means for delivering a supply of water to said piping; means operative to effect movement of said tractors along their respective lines of travel so as to move said piping over the surface of the ground; and control means for said motor means, said control means having a control lever connected to said piping so as to be moved from inactive to active position when the engaged portion of the piping is moved into disaligned position.

2. In an overhead irrigating device for watering an area of ground: a plurality of laterally spaced tractors; transverse water distributing piping supported by said tractors; water delivery members connected to said piping at spaced points therealong for delivering water to the ground; means for delivering a supply of water to said piping; and means operative to effect movement of said tractors along their respective lines of travel so as to move said piping over the surface of the ground, said last named means including a control connected with the respective tractors operative in response to disalignment of said tractors to change the movement of at least one of said tractors so as to restore the condition of alignment of said tractors.

3. In an overhead irrigating device for watering an area of ground: a plurality of laterally spaced tractors; transverse water distributing piping supported by said tractors; water delivery members connected to said piping at spaced points therealong for delivering water to the ground; means for delivering a supply of water to said piping; means operative to effect movement of said tractors along their respective lines of travel so as to move said piping over the surface of the ground, said last named means including a control connected with the respective tractors operative in response to disalignment of said tractors to change the movement of at least one of said tractors so as to restore the condition of alignment of said tractors; and portative means on said tractors operative to enable movement thereof laterally with respect to themselves and longitudinally with respect to said piping so as to shift said irrigating device laterally onto another area of ground to be watered.

4. In an overhead irrigating device for watering an area of ground: a plurality of laterally spaced tractors; transverse water distributing piping supported by said tractors; water delivery members connected to said piping at spaced points therealong for delivering water to the ground; means for delivering a supply of water to said piping; means operative to effect movement of said tractors along their respective lines of travel so as to move said piping over the surface of the ground; and means acting in response to disalignment of one of said tractors forwardly or rearwardly of the remaining tractors to render said irrigating device inactive.

5. In an overhead irrigating device for watering an area of ground: a plurality of laterally spaced tractors; transverse water distributing piping supported by said tractors; water delivery members connected to said piping at spaced points therealong for delivering water to the ground; means for delivering a supply of water to said piping; means operative to effect movement of said tractors along their respective lines of travel so as to move said piping over the surface of the ground, said last named means including a control connected with the respective tractors operative when disalignment of said tractors occurs to change the movement of at least one of said tractors so as to restore the condition of alignment of said tractors, portative means on said tractors operative to enable movement thereof laterally with respect to themselves and longitudinally with respect to said piping so as to shift said irrigating device laterally onto another area of ground to be watered; and means acting in response to disalignment of one of said tractors forwardly or rearwardly of the remaining tractors to render said irrigating device inactive.

6. In an overhead irrigating device for watering an area of ground: a plurality of laterally spaced tractors; transverse water distributing piping supported by said tractors; means for connecting said pipes to said tractors; water delivery members connected to said piping at spaced points therealong for delivering water to the ground; means for delivering a supply of water to said piping; a container for an additive mounted on one of said tractors; means for delivering the additive to said water; and means operative to effect movement of said tractors along their respective lines of travel so as to move said piping over the surface of the ground.

7. In an overhead irrigating device for watering an area of ground: a plurality of laterally spaced tractors; transverse water distributing piping supported by said tractors; means for connecting said pipes to said tractors; water delivery members connected to said piping at spaced points therealong for delivering water to the ground; means for delivering a supply of water to said piping; a container for an additive mounted on one of said tractors; means for delivering the additive to said water; and means operative to effect movement of said tractors along their respective lines of travel so as to move said piping over the surface of the ground, said last named means comprising a hydraulic motor on each of said tractors, and means for feeding water from said piping through said motors.

8. In an overhead irrigating device for watering an area of ground: a plurality of laterally spaced tractors; transverse water distributing piping supported by said tractors; water delivery members connected to said piping at spaced points therealong for delivering water to the ground; means for delivering a supply of water to said piping; means operative to effect movement of said tractors along their respective lines of travel so as to move said piping over the surface of the ground; tubular members extending rearwardly from said piping so as to be pulled along as the piping moves forwardly; and at least one spray member supported by and connected to each of said tubular members rearwardly of said piping.

9. In means for irrigating an area of ground: a main tractor; piping extending laterally from said main tractor; an end tractor to support the outboard end of said piping; intermediate tractors supporting intermediate portions of said piping; motor means for driving said tractors; control means operating to keep said end tractor in lateral alignment with said main tractor; control means having a control part connected to said intermediate tractors and to parts of said piping spaced therefrom for speeding or retarding the operation of the motors of said intermediate tractors, so that they will be kept in alignment with said main tractor and said end tractor; means for delivering water under pressure to said piping; and water delivery means spaced along and being connected to said piping.

10. An irrigation means as defined in claim 9 having guide means extending along the area which is to be irrigated, said guide means guiding said main tractor along a line of travel.

11. Irrigating means as defined in claim 9 including means forming a water channel extending along the line of travel of the tractor, pumping means arranged to travel along with said main tractor for delivering water to said piping, said pumping means having a suction tube extending down into said channel; and water delivery means spaced along and being connected to said piping.

12. Irrigating means as defined in claim 9 having means for metering the water which is fed to said piping and control means operating under control of said meter for correlating the forward movement of said tractor with the rate of flow of water through said meter, to effect an even distribution of water over the ground of said area.

13. Irrigating means as defined in claim 9, having lines extending from said main tractor to said end tractor for actuating the control means of said end tractor.

14. Irrigating means as defined in claim 9, having hydraulic motors mounted on said end and intermediate tractors for driving the same, said hydraulic motors being arranged to be operated by water from said piping.

15. Irrigating means as defined in claim 9, having hydraulic motors mounted on said end and intermediate tractors for driving the same, valve means connecting said hydraulic motors with said piping, and connections whereby control means actuate said valve to selectively increase and decrease the flow of water to said hydraulic motors.

References Cited in the file of this patent

UNITED STATES PATENTS

| | | |
|---|---|---|
| 1,085,609 | Heath | Feb. 3, 1914 |
| 1,176,856 | Salmond | Mar. 28, 1916 |
| 1,334,808 | Silky | Mar. 13, 1920 |
| 1,346,843 | Ramen | July 20, 1920 |
| 1,966,783 | Balaam | July 17, 1934 |